(12) United States Patent
Madou et al.

(10) Patent No.: US 10,587,641 B2
(45) Date of Patent: Mar. 10, 2020

(54) POINT-WISE PROTECTION OF APPLICATION USING RUNTIME AGENT AND DYNAMIC SECURITY ANALYSIS

(71) Applicant: MICRO FOCUS LLC, Santa Clara, CA (US)

(72) Inventors: Matias Madou, Diegem (BE); Ronald Joseph Sechman, Alpharetta, GA (US); Sam Ng Ming Sum, Hong Kong (CN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/312,645

(22) PCT Filed: May 20, 2014

(86) PCT No.: PCT/US2014/038854
§ 371 (c)(1),
(2) Date: Nov. 20, 2016

(87) PCT Pub. No.: WO2015/178896
PCT Pub. Date: Nov. 26, 2015

(65) Prior Publication Data
US 2017/0187743 A1    Jun. 29, 2017

(51) Int. Cl.
*H04L 29/06* (2006.01)
*G06F 21/57* (2013.01)
*G06F 21/56* (2013.01)

(52) U.S. Cl.
CPC ........ *H04L 63/1433* (2013.01); *G06F 21/566* (2013.01); *G06F 21/577* (2013.01); *H04L 63/1441* (2013.01); *G06F 2221/033* (2013.01)

(58) Field of Classification Search
CPC ............ H04L 63/1433; H04L 63/1441; G06F 21/577; G06F 21/566; G06F 2221/033
See application file for complete search history.

(56) References Cited

U.S. PATENT DOCUMENTS

| | | | |
|---|---|---|---|
| 6,427,234 B1 | 7/2002 | Chambers et al. | |
| 7,647,637 B2 | 1/2010 | Schuba et al. | |
| 7,845,006 B2 | 11/2010 | Akulavenkatavara et al. | |
| 8,407,800 B2 | 3/2013 | Schloegel et al. | |
| 9,104,878 B1 * | 8/2015 | Khairetdinov | G06F 21/577 |
| 9,154,137 B2 * | 10/2015 | Olgiati | G06F 17/5027 |
| 9,680,864 B2 * | 6/2017 | Khesin | G06F 21/568 |

(Continued)

FOREIGN PATENT DOCUMENTS

| | | |
|---|---|---|
| TW | 201224836 A | 6/2012 |
| TW | 201413488 A | 4/2014 |
| WO | WO-2013/142979 A1 | 10/2013 |

OTHER PUBLICATIONS

Fang Yu and Yi-Yang Tung, "Patcher: an Online Service for Detecting, Viewing and Patching Web Application Vulnerabilities," Oct. 26, 2013, pp. 1-9.

(Continued)

*Primary Examiner* — Mahfuzur Rahman

(57) ABSTRACT

Example embodiments disclosed herein relate to generating a point-wise protection based on dynamic security analysis. Vulnerability solution recommendation are provided based on the dynamic security analysis. A point-wise protection is generated based on a selection of the vulnerability solution recommendation.

17 Claims, 4 Drawing Sheets

(56) References Cited

U.S. PATENT DOCUMENTS

| | | | |
|---|---|---|---|
| 2002/0138748 A1* | 9/2002 | Hung | G06F 21/6281 713/190 |
| 2003/0233438 A1* | 12/2003 | Hutchinson | G06Q 10/10 709/223 |
| 2004/0025009 A1* | 2/2004 | Camber | G06F 8/52 713/152 |
| 2004/0133386 A1* | 7/2004 | Swoboda | G06F 11/2236 702/176 |
| 2004/0210653 A1* | 10/2004 | Kanoor | G06F 8/65 709/223 |
| 2005/0049999 A1* | 3/2005 | Birn | G06F 11/3636 |
| 2006/0031938 A1* | 2/2006 | Choi | G06F 21/552 726/25 |
| 2006/0282897 A1 | 12/2006 | Sima et al. | |
| 2007/0074188 A1 | 3/2007 | Huang et al. | |
| 2008/0083030 A1 | 4/2008 | Durham et al. | |
| 2008/0178287 A1* | 7/2008 | Akulavenkatavara | G06F 11/3644 726/22 |
| 2008/0209567 A1* | 8/2008 | Lockhart | G06F 11/3612 726/25 |
| 2009/0077666 A1 | 3/2009 | Chen et al. | |
| 2010/0205669 A1 | 8/2010 | Mantripragada et al. | |
| 2010/0251000 A1 | 9/2010 | Lyne | |
| 2011/0214179 A1 | 9/2011 | Chow et al. | |
| 2011/0231361 A1* | 9/2011 | Patchava | G06F 21/50 707/602 |
| 2012/0030513 A1* | 2/2012 | Peng | G06F 11/2097 714/37 |
| 2012/0117644 A1* | 5/2012 | Soeder | G06F 21/554 726/22 |
| 2012/0144480 A1 | 6/2012 | Miller et al. | |
| 2012/0255014 A1* | 10/2012 | Sallam | G06F 21/554 726/24 |
| 2013/0055369 A1 | 2/2013 | Kumar | |
| 2013/0086689 A1* | 4/2013 | Laverdiere-Papineau | G06F 21/577 726/25 |
| 2013/0145347 A1 | 6/2013 | Karr et al. | |
| 2013/0254833 A1 | 9/2013 | Nicodemus et al. | |
| 2014/0026121 A1* | 1/2014 | Jackson | G06F 9/44521 717/124 |
| 2014/0165204 A1 | 6/2014 | Williams | |
| 2015/0007156 A1* | 1/2015 | Tkach | G06F 8/656 717/170 |
| 2015/0220453 A1* | 8/2015 | Heisswolf | G06F 12/1441 726/27 |
| 2015/0237063 A1 | 8/2015 | Cotton | |
| 2015/0350311 A1* | 12/2015 | Arai | G06F 8/65 709/203 |
| 2016/0246965 A1 | 8/2016 | Cornell | |

OTHER PUBLICATIONS

Fathy E. Eassa et al., "IMATT: An Integrated Multi-Agent Testing Tool for the Security of Agent-Based Web Applications," World Journal of Computer Application and Technology 1(2), Oct. 3, 2013, pp. 1-10.

International Search Report and Written Opinion, International Application No. PCT/US2014/038848, dated Jan. 23, 2015, pp. 1-8, KIPO.

International Search Report and Written Opinion, International Application No. PCT/US2014/038854 dated Jan. 23, 2015; pp. 1-9 KIPO.

Notice of Allowance, TW Application No. 104115574 dated Jul. 21, 2016, pp. 1-3, TIPO.

Taesoo Kim et al., "Efficient Patch-Based Auditing for Web Application Vulnerabilities," 10th USENIX Symposium on Operating Systems Design and Implementation, Sep. 21, 2012, pp. 193-206, USENIX Association.

\* cited by examiner

POINT-WISE PROTECTION OF APPLICATION USING RUNTIME AGENT AND DYNAMIC SECURITY ANALYSIS

BACKGROUND

Software security testing is used to identify vulnerabilities in an application such as a Web application. Static Code Analysis is the analysis of computer software that is performed without actually executing programs. Dynamic Analysis is the analysis of computer software performed on executing programs.

BRIEF DESCRIPTION OF THE DRAWINGS

The following detailed description references the drawings, wherein.

DETAILED DESCRIPTION

Figure 1:
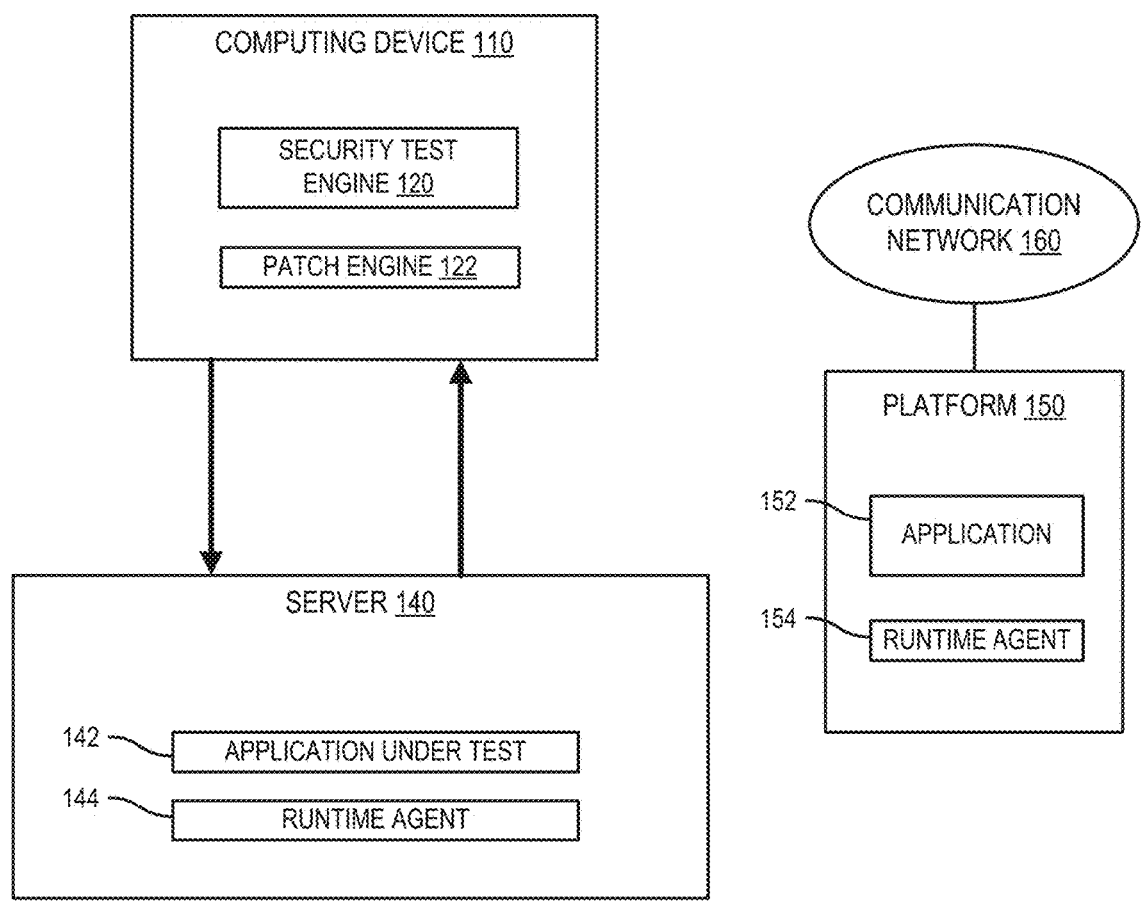
FIG. 1 is a block diagram of a computing system capable of generating a point-wise protection to be implemented using a runtime agent, according to one example.

As noted, software security testing of applications can be performed to determine vulnerabilities in an application, such as a web application. Testing can be done to ensure that data used by the web application is protected from being overwritten and/or read, to ensure that the web application stays up, to protect against various attacks, etc.

When a company desires to know how secure a web application the company has in production is or going to be put into production, the company often uses a security testing solution. The company may wish to use a copy of the application in production as an Application Under Test (AUT). A reason to use an application in production or an application that is going to be put into production for testing is that the company may desire to test the same code in a manner that modifications to the AUT are not allowed. Using an AUT that is going to be the application in production at a quality assurance stage ensures that the application used in production has been tested.

Fixing vulnerabilities that are discovered by software security testing such as static or dynamic security testing can take time. When numerous applications are scanned and numerous vulnerabilities are found within each application, the time to fix the issues outnumbers the time the developers may have to put these applications into production. On top of that, some of these applications are already in production so a fix may be desired in a timely fashion.

Accordingly, various embodiments described herein relate to a fix (e.g., a temporary fix) that may be used to get the vulnerable applications in production in a safe way. Additionally or alternatively, when the applications are already in production, patches (e.g., temporary patches) may be used to make sure the apps are hardened to withstand attacks. The patches can be implemented using a runtime agent executing with the application in production. Further, because the fix can be specific, the whole application may not need to be tested again to implement the fix.

From a high level, the approaches described herein use instrumentation technology to automatically apply the "patches" used to fix the vulnerabilities found by a security analysis tool (e.g., a dynamic analysis tool) in order to create point-wise protections for the problems which can be applied at the code level.

The result file of a security analysis (e.g., a static analysis solution, a dynamic analysis solution, etc.) can be a list of theoretical vulnerabilities in the application. For each issue (potential vulnerability), line of code details can be provided to show where the problem in the code is.

A runtime agent can be used to monitor program points in the application and if necessary, take action when certain behavior is spotted. In this manner, the vulnerabilities determined by the security analysis solution can be converted in a point-wise protection patch for the issue and implemented using the runtime agent. Further, because the runtime agent can run separately and overlay the code of the application, the tested production application can be implemented while having the additional protections. The protections can be specific and thus may not need to be tested with the whole application. In some examples, suggested protections may be tested separately prior to being included as a suggestion.

The runtime agent can be implemented as a Runtime Instrumentation Engine. Runtime instrumentation refers to the ability to modify the program code at runtime (or load time) for monitoring, tracing, debugging, or adding extra functionality to the original program code. Various frameworks offer various approaches to enabling this functionality. For example, the Microsoft .NET® framework can use the ICorProfilerCallback and ICorProfilerCallback2 interfaces to help enable such functionality. Other frameworks can include Java,™ WebObjects, web2py, etc. The engine can be in the form of a library or a dynamic-link library (DLL), and can be activated during an early stage of the program initialization to transform any other program code, classes, etc. that are loaded thereafter. The configuration file can instruct the engine as to what should be transformed, intercepted, or monitored.

The result file is analyzed and the locations of possible vulnerabilities can be determined. Particular types of vulnerabilities that may be common may be associated with particular solutions. These solutions (e.g., one or more lines of code to be executed for the application via the runtime agent) can be provided (e.g., output, presented, emailed, etc.) to a user. The user can provide input (e.g., a selection, writing or modification of code, etc.) to generate a patch executable by the runtime agent. Once the code to either add to or replace executable code of the application is determined, a point-wise patch can be generated. The patch can be sent to be used with one or more applications (e.g., applications of the same type and/or version as the application tested). A runtime agent can use the patch to implement the point-wise protection on the application(s).

A benefit of allowing a user to be able to view and/or edit the added/replacement code is that the user is able to see what the intention of a coder of the application had. For example, if usage of a particular function took in 4 digits to lookup a particular location on a map would not need to be protected as much as usage of the function for looking up something about a user based on their birth date. Accordingly, the context of the code can be useful in determining whether a fix is necessary and/or what the appropriate fix would be.

FIG. 1 is a block diagram of a computing system capable of generating a point-wise protection to be implemented using a runtime agent, according to one example. The system 100 can include a computing device 110 that communicates with a server 140 via a communication network. In certain examples, the computing device 110 and server 140 are computing devices, such as servers, client computers, desktop computers, workstations, tablets, mobile computers, etc. In other embodiments, the devices can include special purpose machines. In some examples, devices can be implemented via a processing element, memory, and/or other components.

The security test engine 120 can be used to test an application under test (AUT) 142 executed using the server 140. The AUT 142 can be implemented in conjunction with a runtime agent 144. The security test engine 120 can execute a dynamic test on the AUT 142 to generate a list of possible vulnerabilities. The patch engine 122 can generate a patch to be implemented on a platform 150 providing an application 152 corresponding to the AUT 142. The platform 150 may be executed on a server or other computing device. The runtime agent 154 can be used to implement the patch. Communication network 160 (e.g., the Internet, Local Area Network (LAN), Wide Area Network (WAN), etc.) can be used to provide the application 152 to devices.

The engines 120, 122 include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

The security test engine 120 can perform analysis on the AUT 142. The AUT 142 can be an application, such as a web application. In certain examples, the security test engine 120 can include a dynamic module, such as a web application scanner. In other examples, the security test engine 120 can include a static tool, such as a static analysis tool. In some examples, a combination of static and dynamic analysis can be used. Further, in some examples, a dynamic analysis tool is an analysis of computer software that is performed while executing some or all of the AUT 142. The analysis may execute to determine vulnerabilities based on one or more rules or configurations. The result of this can be a data structure (e.g., list) of issues (e.g., potential vulnerabilities) in the application. The issues can include line of code details associated with the potential vulnerability. The list can be output and processed.

As noted above, security code analysis can include various types of static code analysis and/or dynamic code analysis (e.g., penetration testing). In this case, the runtime agent 144 can execute during the test and provide the line of code information associated with the vulnerabilities found (e.g., what was being executed when the vulnerability was found). In some examples, the line of code information can also include trace information. In some examples, a trace or stack trace is a report of active stack frames at a certain point in time during execution of the AUT 142. As such, the runtime agent 144 can record and provide information of where the vulnerability occurs. In one example, the stack trace can include the functions used (e.g., main( ), function( ), write( )) to generate trace information. The dynamic security analysis can be performed on the AUT 142 that includes communication from the runtime agent to trace information in the dynamic security analysis as further described in FIG. 2.

The computing device 110 can also include the patch engine 122 to process the outputted list or data structure. The patch engine 122 can be used to process security information in the form of the data structure including possible vulnerabilities of the application to determine respective vulnerability solution recommendations for the possible vulnerabilities. The security information can include the possible vulnerabilities as well as line of code information associated with the respective possible vulnerabilities. In certain examples, the security information can be received from a security code analysis tool.

In one example, the potential vulnerabilities can be presented to a user. The presented potential vulnerabilities can be considered vulnerability solution recommendations or recommendations of places in the code to fix vulnerabilities. The presentation may further include more specific solution recommendations such as possible patch recommendations that include replacement code. Examples of vulnerabilities that can be detected include cross-site scripting, a race condition: singleton member field, insecure randomness, Axis 2 Misconfiguration: Debug Information, remote code execution, SQL injection, format string vulnerabilities, username enumeration, etc.

In one example, the system can provide the user with an ability to input which of the vulnerability solution recommendations to address. These can be issues that are more important to an organization deploying the application. When the recommendations are being addressed, the more specific solution recommendations can be provided. In one example, the process is semi-automatic (e.g., one or more recommended changes are brought to the attention of the user and the user can select the change). In the semi-automatic case, the user may also be provided an opportunity to edit code to be implemented. The code changes can be turned into a point-wise protection that can be executed by a runtime agent. One or more point-wise protections can be combined into a configuration file that can be implemented by a runtime agent 154 used to protect an application 152. The application 152 can be one that is already in the field and/or an application that is going to be implemented.

An interface engine (not shown) can be used to present at least one of the respective vulnerability solution recommendations and to receive selection input for the one vulnerability solution recommendation. In some examples, the vulnerability solution recommendations can include a type of vulnerability detected and a location of the vulnerability. In other examples, the vulnerability solution recommendations can further include one or more approaches to fixing or mitigating the potential vulnerability. Table 1 includes some examples of possible patches for vulnerabilities.

TABLE 1

| Vulnerabilities | Possible Patch |
|---|---|
| Cross-site Scripting | Install an input validation filter and may or may not require the user to provide the |

TABLE 1-continued

| Vulnerabilities | Possible Patch |
| --- | --- |
| Race Condition: Singleton Member Field | validation pattern<br>Instrument the code to automatically lock the race object before access |
| Insecure Randomness | Instrument the code to use secure random number generator instead |
| Axis 2 Misconfiguration: Debug Information | Instrument the code to disable debug flag |

The user can select the vulnerability. The user can then be presented with an opportunity to see the location(s) of the selected vulnerability and/or one or more possible patches. In one example, the user can enter code to replace code determined to be a vulnerability. In another example, the patch engine 122 can provide the possible fix. In a further example, the user can be presented the current code as well as one or more possible fix as options. The user can also be provided the ability to change the code. The patch engine 122 can be used to generate respective point-wise protection based on the selection input and the processed security information (e.g., line of code information). The point-wise protection can be capable of being implemented using a runtime agent to protect a second application 152 corresponding to the application being tested. For example, the second application 152 may be an application that is currently in production or is being put into use. In some examples, the second application 152 and the AUT 142 can be of a same version number. This can include the same version of the application and/or a portion of the code of the application. Moreover, the runtime agents used can be of a same version.

In some examples, the point-wise protection can be in the form of an instruction to a runtime agent to intercept execution of the second application and run replacement code instead. Thus, the point-wise protection can functionally replace code of at least a portion of the application. In this example, the code of the actual application is not replaced, but functionally replaced because the code of the application is not executed, but instead, the runtime agent executes the protection instead. In some examples, the point-wise protection may add some code to be executed (e.g., via adding a security check). In some examples, multiple points may be intercepted to protect against a vulnerability.

Implementation of the point-wise protection can cause the runtime agent 154 to execute the point-wise protection when a point of a code of the second application is reached that is associated with the vulnerability associated with the fix. The point of code may be based on the trace information. As noted, a stack trace can include a set of active stack frames of the AUT when the vulnerability occurred.

In one example, implementation of the point-wise protection can include adding a security check. With this type of protection, the runtime agent 154 can add an authorization check or some other type of analysis of a user, a machine, etc. before allowing certain code to be executed. This can be based on added code and/or use of new library or currently used library of the application. In one example, if the security check is failed, a security action is taken via the runtime agent. In one example, the security action can include denying execution of the code associated with the vulnerability. In another example, the security action may be to point a user of the application to a web page that shows an error.

A processor, such as a central processing unit (CPU) or a microprocessor suitable for retrieval and execution of instructions and/or electronic circuits can be configured to perform the functionality of any of the modules or engines described herein. In certain scenarios, instructions and/or other information, such as a database of potential patches, can be included in memory. Input/output interfaces may additionally be provided by the computing devices. For example, input devices, such as a keyboard, a sensor, a touch interface, a mouse, a microphone, etc. can be utilized to receive input from an environment surrounding the computing device. Further, an output device, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces. The interface engine can use one or more of the input/output interfaces.

Each of the modules (not shown) may include, for example, hardware devices including electronic circuitry for implementing the functionality described herein. In addition or as an alternative, each module may be implemented as a series of instructions encoded on a machine-readable storage medium of computing system and executable by processor. It should be noted that, in some embodiments, some modules are implemented as hardware devices, while other modules are implemented as executable instructions. Moreover, in certain examples, engines/modules of the computing system can be implemented in a single device and/or in multiple devices. Further, a single device may be implemented using multiple machines.

The communication network 160 can use wired communications, wireless communications, or combinations thereof. Further, the communication network 160 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 160 can be in the form of a direct network link between devices. Various communications structures and infrastructure can be utilized to implement the communication network(s).

By way of example, the devices and systems communicate with each other and other components with access to the communication network 160 via a communication protocol or multiple protocols. A protocol can be a set of rules that defines how nodes of the communication network 160 interact with other nodes. Further, communications between network nodes can be implemented by exchanging discrete packets of data or sending messages. Packets can include header information associated with a protocol (e.g., information on the location of the network node(s) to contact) as well as payload information. Network interface cards of the devices/systems may be used for communication.

In one example, a web application is an application that is accessed over a network such as the Internet or an intranet. In certain examples, the web application can run on J2EE Application Server or be an ASP or ASP.NET web application. The frameworks used can use various types of features. In some examples, for example, in the .NET framework, standard Authentication and Authorization frameworks can be used. The approaches for authorization checks being made can be monitored for each type of framework supported. These checks may be useful in securing against particular vulnerabilities.

Figure 2:
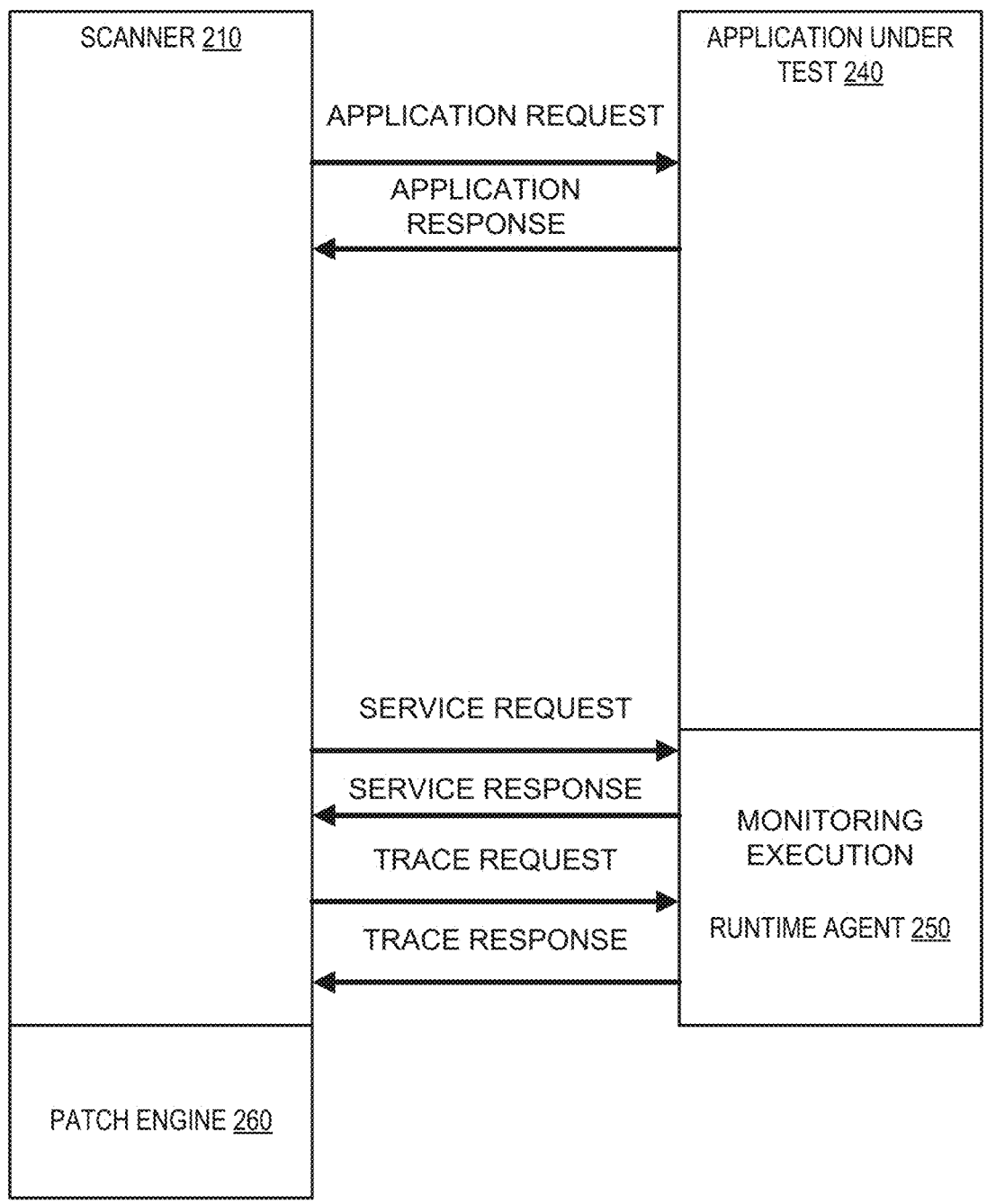
FIG. 2 is a block diagram of a computing system capable of generating a point-wise protection to be implemented using a runtime agent, according to one example.

FIG. 2 is a block diagram of a computing system capable of generating a point-wise protection to be implemented using a runtime agent, according to one example. The system 200 may include a scanner 210, a runtime agent 250, an AUT 240, and a patch engine 260.

The AUT 240 may be encoded in any suitable Web-based computer language, such as JAVA, or .NET, among others. The AUT 240 may operate within a suitable software framework, such as Struts, Struts 2, ASP.NET MVC, Oracle WebLogic, and Spring MVC, among others. The software framework includes a set of common code modules that provide generic functionality, which can be selectively overridden or specialized by user code to providing specific functionality. The AUT 240 may be configured to execute one or more instances of a Java Virtual Machine (JVM), Common Language Runtime (CLR), and/or other runtime environment for processing requests from the scanner 210. The programming instructions provided by the common code modules of the software framework or runtime environment may be referred to as container code. The custom programming instructions specific to the AUT 240 may be referred to as user code. During testing, a scanner 210 can explore the AUT 240 by making HTTP requests and evaluating the HTTP responses or the lack thereof in order to find all of the URLs where the AUT accepts input. Even though examples discussed herein are directed to a scanner 210, it is contemplated other security testing engines, modules, and/or techniques can be used. As shown in system 200, HTTP requests can be used to crawl one or more web pages of the AUT 240 as a general user and receive responses.

The AUT 240 includes a network interface (not shown) for enabling communications between the scanner 210 and the AUT 240 through the network. The network interface exposes the attack surface of the AUT 240 and is the same interface that would eventually be used to provide access to the AUT 240 when the AUT 240 is made available for general use.

Communication between the scanner 210 and the AUT 240 over the network interface may be conducted through application (e.g., via HTTP) requests issued from the scanner 210 to the AUT 240 and HTTP responses issued from the AUT 240 to the scanner 210. Requests targeting the AUT 240 may be referred to as application requests, and responses received from the AUT 240 may be referred to as application responses. The application requests generated by the scanner 210 may be configured to expose potential vulnerabilities of the AUT 240, to respond to tests posed by the AUT 240, or the like.

The runtime agent 250 can operate within the execution environment of the AUT 240 and has access to the internal operations performed by the AUT 240. For example, the runtime agent 250 may modify the bytecode of the AUT 206 by injecting additional code, such as a JAVA class, at various program points. The injected code acts as a monitor that observes the AUT 240. The injected monitor code may be located at strategic program points in the AUT 240, for example, application programming interface (API) calls that perform specific operations.

Communications between the scanner 210 and the runtime agent 250 may be implemented through the use of custom request and response headers. Custom headers may be added to the application requests by the scanner 210, and custom headers may be added to the application responses by the runtime agent 250. In this way, at least some of the communications between the scanner 210 and the runtime agent 250 may be piggy-backed on normal communications with the AUT 240. Using a single channel of communication eliminates any problems with opening a dedicated, secondary channel, and adding HTTP headers typically does not interfere with the normal operation of the AUT 240.

The runtime agent 250 may be used to provide information to the scanner 210 to facilitate testing of the AUT 240. The scanner 210 can communicate with the runtime agent 250 by using service requests and responses. The service requests and responses can be implemented using, for example, custom headers.

In some examples, when vulnerabilities are being checked by the scanner 210, a trace request can be sent to the runtime agent 250 to determine what part of the code of the AUT 240 is associated with the vulnerability. The runtime agent 250 can provide a trace response to provide the location of the vulnerability (e.g., via trace information, line of code information, combinations thereof, etc.). The patch engine 260 can use the vulnerabilities found to determine vulnerability solution recommendations and generate a virtual patch to be executed by another runtime agent as noted above.

Figure 3:
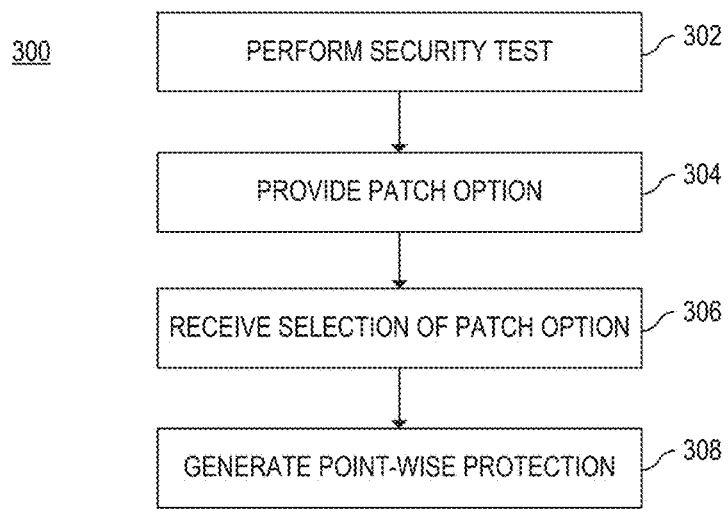
FIG. 3 is a flowchart of a method for generating a point-wise protection capable of being implemented using a runtime agent, according to one example.
Figure 4:
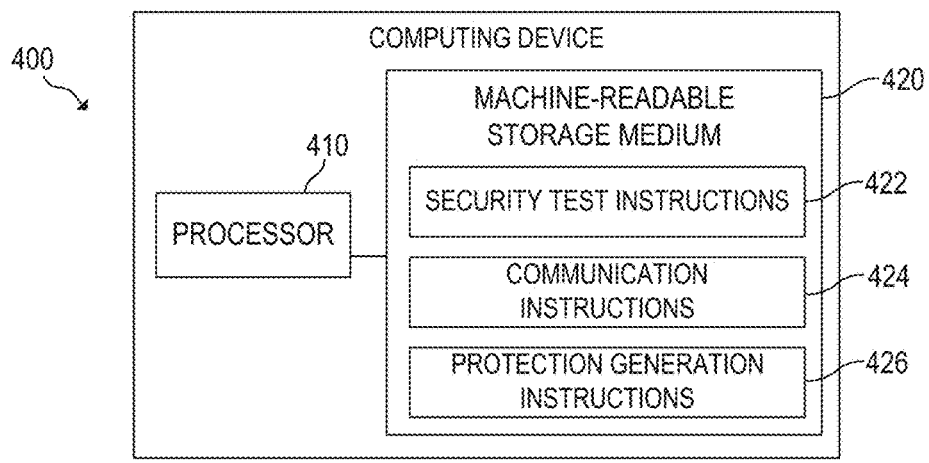
FIG. 4 is a block diagram of a computing device capable of generating a point-wise protection to be implemented using a runtime agent, according to one example.

FIG. 3 is a flowchart of a method for generating a point-wise protection capable of being implemented using a runtime agent, according to one example. FIG. 4 is a block diagram of a computing device capable of generating a point-wise protection to be implemented using a runtime agent, according to one example.

Although execution of method 300 is described below with reference to computing device 400, other suitable components for execution of method 300 can be utilized (e.g., computing device 110). Additionally, the components for executing the method 300 may be spread among multiple devices. Method 300 may be implemented in the form of executable instructions stored on a machine-readable storage medium, such as storage medium 420, and/or in the form of electronic circuitry. In some examples, the computing device 400 may include a processor 410 and machine-readable storage medium 420 including security test instructions 422, communication instructions 424, and protection generation instructions 426.

Communication instructions 424 can be executed to send and receive information. For example, the computing device 400 can receive code to analyze and send information (e.g., code analysis, point-wise protections to be implemented via a runtime agent, etc.). In some examples, a web application can be provided to receive code and provide information. Code received can be source code or other formats of code of an application under test (AUT). This may be compiled for a dynamic test. The compiled code can be executed on a server and tested by the computing device or another computing system.

At 302, security test instructions 422 can be implemented to perform a security test to determine possible vulnerabilities and respective line of code information about the possible vulnerabilities. This can be via, for example, dynamic analysis described herein using a runtime agent and/or using other approaches. Line of code information can include a location of the code and/or the actual code (e.g., source code, compiled code, etc.). This can be provided by the runtime agent. It can also include trace information. Further, the trace information can be determined by communicating with a runtime agent executing on a server with the AUT. The trace information can include at least one location of code of the AUT as described herein. The information may also include information about a type of the vulnerability. For example, the information may say that the vulnerability is in a particular category (e.g., cross-site scripting) and/or one or more subcategories (e.g., for more specific vulnerabilities). This can be based on various types of classification.

At 304, protection generation instructions 426 can be executed by the processor 410 to provide vulnerability solution recommendation(s) for the vulnerability or vulnerabilities found. Vulnerability solution recommendations can be determined for one or more of the vulnerabilities. In some examples, the vulnerability solution recommendation can point to a location in the code where the issue is present and provide information about the vulnerability (e.g., name, category, classification, etc.).

In some examples, a data structure or database can include a mapping of the identified vulnerabilities (e.g., based on classification or categorization of the vulnerabilities) to one or more implementable possible solutions. For example, a cross-site scripting issue with a particular framework may be mapped to one or more possible ways of fixing or containing the issue. Moreover, the possible solutions can be prioritized. Implementable possible solutions can include a recommendation to add and/or replace at least some of the code of the AUT with code to fix/mitigate the issue.

Communication instructions 424 can be used to present the respective vulnerability solution recommendations. For example, a presentation can include a function of code (e.g., .in foo.java), the location of the code (e.g., line 20), a type of vulnerability/categorization, a recommended fix (e.g., there should be an additional check), or combinations thereof. The recommended fix can also be more specific (e.g., what type or types of checks to include, code to include, etc.).

At 306, the communication instructions 424 can be executed to receive selection input for one of the vulnerability solution recommendations. The selection input may include a selection of one or more implementable possible solution and/or selection of one of the identified vulnerabilities. The selection can prompt showing of the vulnerability and/or implementable solution with the vulnerability. Moreover, a prompt can be provided to allow a user to input code into the area. In some examples, the vulnerability may have multiple code sections that are shown and allowed to be fixed.

At 308, the protection generation instructions 426 can be executed to generate respective point-wise protection based on the selection input and the vulnerability solution recommendation. As noted above, the point-wise protection can be capable of being implemented using a runtime agent to protect a second application corresponding to the AUT. In some examples, the second application is of a same version as the AUT.

Further, implementation of the point-wise protection can cause the runtime agent to execute the point-wise protection when a point of a code of the second application is reached that is associated with the possible vulnerability. Moreover, the implementation of the point-wise protection can include adding a security check. The security check can be selected and/or added in response to presentation of the possible vulnerabilities. In one example, implementation of the point-wise protection functionally replaces at least part of the code of the second application and executes protection code by the runtime agent.

The protection generated can include instructions to the runtime agent about what to do and when. For example, the protection can instruct the runtime agent to break the code execution of the application when a certain point is reached and perform a virtual patch (e.g., the protection). An end mechanism can also be used. For example, if an additional check is implemented, the code can return to the point it was broken if the additional check is successful. If the additional check is not successful, another action can be taken, for example, killing execution of the application, stopping the application, returning an unauthorized or other error, noting the check and continuing, etc.

The computing device 400 includes, for example, a processor 410, and a machine-readable storage medium 420 including instructions 422, 424, 426 for generating a point-wise protection capable of being executed using a runtime agent. Computing device 400 may be, for example, a notebook computer, a slate computing device, a portable reading device, a server, a workstation, a mobile phone, or any other computing device capable of providing the functionality described herein.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for generating a point-wise protection that is executable by a runtime agent.

Figure 5:
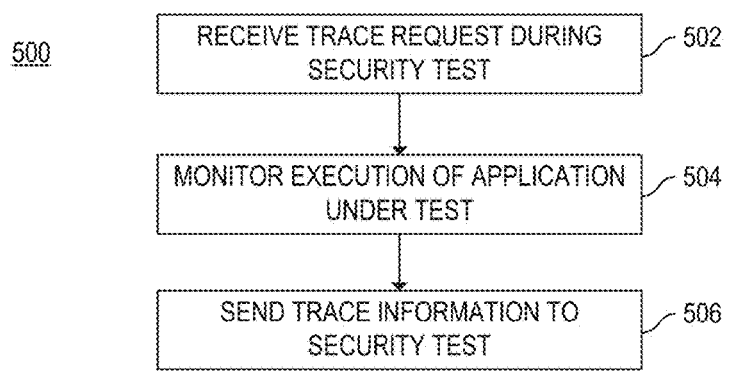
FIG. 5 is a flowchart of a method for performing a security test using a runtime agent to generate information capable of being used to generate a patch implemented using a runtime agent, according to one example.
Figure 6:
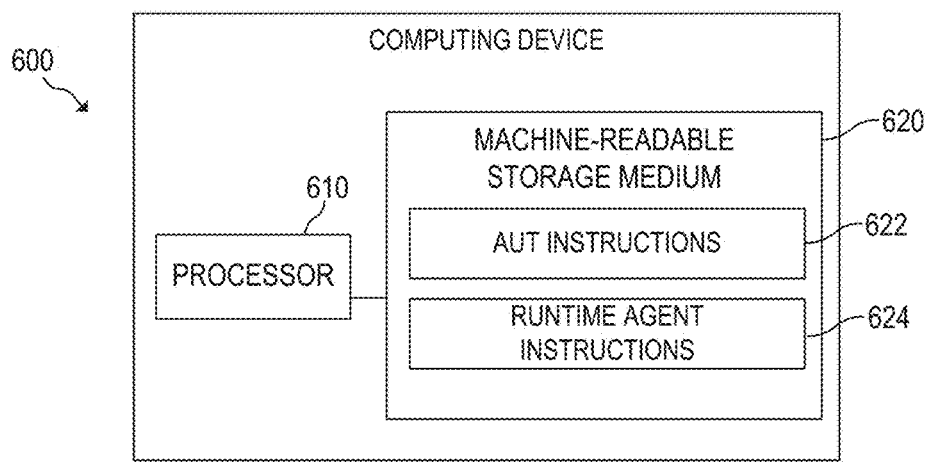
FIG. 6 is a block diagram of a computing device capable of hosting an application under test via dynamic security code analysis using a runtime agent, according to one example.

FIG. 5 is a flowchart of a method for performing a security test using a runtime agent to generate information capable of being used to generate a patch implemented using a runtime agent, according to one example. FIG. 6 is a block diagram of a computing device capable of hosting an application under test via dynamic security code analysis using a runtime agent, according to one example.

The computing device 600 can host an AUT using AUT instructions 622. The AUT can be executed in a runtime environment with a runtime agent executing on a processor 610 using runtime agent instructions 624.

As detailed in FIG. 2, the AUT can be tested and the runtime agent can provide information to a security test (e.g., penetration test) being performed. At 502, the runtime agent receives a trace request during the security test. This request can be from the security test and may be part of a communication that is also used by the AUT. At 504, the runtime agent monitors execution of the AUT. The monitoring can include looking at the code that the AUT is executing. Trace information can include information about the code the AUT is executing (e.g., during a crawling phase and/or during an attack phase). Moreover, the trace information can be requested by and sent to (506) the security test.

In one example, the trace information includes a stack trace that includes a set of active stack frames of the AUT when a vulnerability that was discovered and/or audited occurred. The security test can further classify the vulnerability (e.g., based on rules). Further, the classification can be used to determine one or more possible patch options. This can occur, for example, by having a data structure that includes a mapping of vulnerabilities found by rules to possible patch options or solutions. This can include, for example, a table with mapping of instructions, code, and/or more information about the vulnerability.

The computing device 600 includes, for example, a processor 610, and a machine-readable storage medium 620 including instructions 622, 624, 626 for generating a point-wise protection capable of being executed using a runtime agent. Computing device 600 may be, for example, a notebook computer, a slate computing device, a portable reading device, a server, a workstation, a mobile phone, or any other computing device capable of providing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement method 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for generating a point-wise protection that is executable by a runtime agent.

What is claimed is:

1. A system comprising:
   a hardware processor; and
   a non-transitory storage medium storing instructions executable on the hardware processor to:
   perform a dynamic security analysis on an application under test (AUT) executed on a server to determine a vulnerability of the AUT, wherein the dynamic security analysis includes a communication to a first runtime agent at the server to trace information, in the dynamic security analysis, relating to a code portion of the AUT associated with the vulnerability, wherein the traced information includes line of code information that indicates a location of the code portion of the AUT associated with the vulnerability;
   receive input selecting a vulnerability solution recommendation for the vulnerability;
   generate a point-wise protection code based on the input; and
   send the point-wise protection code to a second runtime agent, the point-wise protection code executable by the second runtime agent to run, in response to reaching a point of code of a second application during execution of the second application that is different from the AUT, replacement code in place of a code portion of the second application to alleviate the vulnerability at the second application, wherein the point-wise protection code comprises an instruction to break code execution in response to reaching the point of code of the second application indicated by the line of code information in the traced information, the running of the replacement code functionally replacing the code portion of the second application without actually replacing the code portion of the second application.

2. The system of claim 1, wherein the generating of the point-wise protection code includes adding code to perform a security check by the second runtime agent to check the point-wise protection code and take a security action via the second runtime agent if the security check failed.

3. The system of claim 1, wherein the instructions are executable on the hardware processor to:
   provide to a second server running the second application the point-wise protection code for execution by the second runtime agent at the second server.

4. The system of claim 1, wherein the traced information includes a point of the code portion of the AUT associated with the vulnerability.

5. The system of claim 4, wherein the traced information includes a set of active stack frames of the AUT when the vulnerability occurred.

6. The system of claim 1, wherein the instructions are executable on the hardware processor to present the vulnerability solution recommendation for the vulnerability as part of a plurality of vulnerability solution recommendations to a user, and the receiving of the input comprises receiving user selection of the vulnerability solution recommendation from the plurality of vulnerability solution recommendations.

7. The system of claim 6, wherein the plurality of vulnerability solution recommendations presented to the user comprise recommended patches for respective vulnerabilities of the AUT, and the receiving of the input comprises receiving user selection of a given recommended patch of the recommended patches.

8. The system of claim 7, wherein the instructions are executable to receive a user edit of a code of the given recommended patch to produce the replacement code.

9. The system of claim 6, wherein the plurality of vulnerability solution recommendations presented to the user identify respective different types of vulnerabilities of the AUT.

10. A non-transitory machine-readable storage medium storing instructions that, if executed by at least one hardware processor of a computing system, cause the computing system to:
    perform a dynamic security analysis test on an application under test (AUT) to determine a vulnerability of the AUT, wherein the dynamic security analysis test includes communication with a first runtime agent executing with the AUT to receive trace information relating to a code portion of the AUT, wherein the trace information includes line of code information that indicates a location of a point of the code portion of the AUT associated with the vulnerability, and a set of active stack frames of the AUT when the vulnerability occurred;

classify the vulnerability;

provide a vulnerability solution recommendation for the classified vulnerability;

receive a selection of the vulnerability solution recommendation; and generate a point-wise protection code based on the selection, wherein the point-wise protection code is executable by a second runtime agent to run, in response to reaching a point of code of a second application during execution of the second application that is different from the AUT, replacement code in place of a code portion of the second application to address the classified vulnerability at the second application, the running of the replacement code functionally replacing the code portion of the second application without actually replacing the code portion of the second application, wherein the point of code of the second application is indicated by the line of code information in the trace information relating to the code portion of the AUT.

11. The non-transitory machine-readable storage medium of claim 10, wherein the second application is of a same version as the AUT, and the point-wise protection code comprises an instruction to break code execution in response to reaching the point of code of the second application indicated by the line of code information, and the instructions if executed cause the computing system to further:

send the point-wise protection code to the second runtime agent, the sending of the point-wise protection code to the second runtime agent causing execution of the point-wise protection code by the second runtime agent to run the replacement code in place of the code portion of the second application to address the classified vulnerability at the second application.

12. The non-transitory machine-readable storage medium of claim 10, wherein the providing of the vulnerability solution recommendation for the classified vulnerability comprises presenting the vulnerability solution recommendation for the classified vulnerability as part of a plurality of vulnerability solution recommendations to a user, and the receiving of the selection comprises receiving user selection of the vulnerability solution recommendation from the plurality of vulnerability solution recommendations.

13. The non-transitory machine-readable storage medium of claim 12, wherein the plurality of vulnerability solution recommendations presented to the user comprise recommended patches for respective vulnerabilities of the AUT, and the receiving of the selection comprises receiving user selection of a given recommended patch of the recommended patches.

14. The non-transitory machine-readable storage medium of claim 13, wherein the instructions if executed cause the computing system to receive an edit of a code of the given recommended patch to produce the replacement code.

15. A method executed by a system comprising a hardware processor, comprising:

performing a dynamic security analysis test on an application under test (AUT) to determine a vulnerability of the AUT, wherein the dynamic security analysis test includes communication with a first runtime agent executing with the AUT to receive trace information of the AUT, wherein the trace information includes line of code information that indicates a location of a code portion of the AUT, the code portion of the AUT associated with the vulnerability;

presenting, to a user, a vulnerability solution recommendation for the vulnerability;

receiving a user selection of the vulnerability solution recommendation;

generating a point-wise protection code based on the user selection; and sending the point-wise protection code to a second runtime agent, the point-wise protection code executable by the second runtime agent to run, in response to reaching a point of code of a second application during execution of the second application that is different from the AUT, replacement code in place of a code portion of the second application to address the vulnerability at the second application, wherein the point-wise protection code comprises an instruction to break code execution in response to reaching the point of code of the second application indicated by the line of code information in the trace information, the running of the replacement code functionally replacing the code portion of the second application without actually replacing the code portion of the second application.

16. The method of claim 15, further comprising:

receiving, by the first runtime agent, a trace request during the dynamic security analysis test;

monitoring, by the first runtime agent, execution of the AUT to determine the trace information; and sending the trace information to a security test engine performing the dynamic security analysis test.

17. The method of claim 16, wherein the trace information includes a stack trace that includes a set of active stack frames of the AUT when the vulnerability occurred, the method further comprising:

classifying, by the security test engine, the vulnerability; and looking up a possible patch option from a data structure based on the classification.

* * * * *